United States Patent [19]

Williams et al.

[11] 3,842,926
[45] Oct. 22, 1974

[54] WALKING WHEELED VEHICLE

[75] Inventors: Joseph Williams, St. Clair Shores; Clifford D. Bradley, Madison Heights; Howard C. Mottin, Warren, all of Mich.

[73] Assignee: The United States of America as represented by the Secretary of the Army, Washington, D.C.

[22] Filed: Nov. 12, 1971

[21] Appl. No.: 198,250

Related U.S. Application Data

[63] Continuation-in-part of Ser. No. 32,877, April 29, 1970, abandoned.

[52] U.S. Cl............. 180/8 R, 180/6.48, 180/7 R, 180/8 E, 180/41, 280/6 H
[51] Int. Cl............................. B62d 57/02
[58] Field of Search.......... 180/6 R, 7 R, 6.48, 8 E, 180/41; 280/6 H

[56] References Cited
UNITED STATES PATENTS

| | | |
|---|---|---|
| 2,918,738 | 12/1959 | Barr.................................. 180/8 X |
| 3,057,319 | 10/1962 | Wagner.............................. 115/1 |
| 3,109,506 | 11/1963 | Schroter............................. 180/8 |
| 3,161,246 | 12/1964 | Meeker et al..................... 180/6.48 |
| 3,374,848 | 3/1968 | Castelet............................. 180/41 |

*Primary Examiner*—Leo Friaglia
*Assistant Examiner*—Randall A. Schrecengost
*Attorney, Agent, or Firm*—Eugene E. Stevens, III

[57] ABSTRACT

A "walking" vehicle having driving wheels connected to the same or individual power source which permits one wheel to be moved forward individually, or any number of wheels at a time, while the other wheels provide the reactive force. After all wheels have been advanced, the entire vehicle body is then moved forward with respect to the wheels.

The invention described herein may be manufactured, used, licensed by or for the Government for governmental purposes without payment to us of any royalty thereon.

4 Claims, 11 Drawing Figures

JOSEPH WILLIAMS
CLIFFORD D. BRADLEY
HOWARD C. MOTTIN
INVENTORS

BY Harry M. Saragovitz
Edward J. Kelly,
Herbert Berl &
Robert M. Lyon
ATTORNEYS

JOSEPH WILLIAMS
CLIFFORD D. BRADLEY
HOWARD C. MOTTIN
INVENTORS

BY Harry M. Saragovitz
Edward J. Kelly
Herbert Berl &
Robert M. Lyon
ATTORNEYS

JOSEPH WILLIAMS
CLIFFORD D. BRADLEY
HOWARD C. MOTTIN
INVENTORS

WALKING WHEELED VEHICLE

CROSS-REFERENCES TO RELATED APPLICATIONS

This application is a continuation-in-part of our application Ser. No. 32,877, filed Apr. 29, 1970 and now abandoned relating to a Walking Wheeled Vehicle.

BACKGROUND OF THE INVENTION

1. Field of the Invention

This invention relates to walking type wheeled vehicles propelled by rotating the wheels and by interchangeably moving the axles of the wheels forwardly and rearwardly with respect to the rest of the vehicle body in order to produce such walking action by this recurrent movement of the wheels. This invention may be further broadly described as a multiple wheel and arm suspension system for actuating a wheel or a plurality of wheels.

2. Description of the Prior Art

Much emphasis has been placed in the improvement of wheeled vehicles in off-road performance. In U.S. Pat. No. 3,109,506 granted Nov. 5, 1963 the wheels on its vehicle are propelled by a single structural member at each corner of the vehicle. Such design hindered the vehicle from covering a large distance on each revolution of the arm member. Many special purpose vehicles incorporating articulated bodies, large wheels, square wheels, and multiple wheel suspension systems have been introduced. Torque limiting controls provided heretofore for walking vehicles are characterized by being of heavy and costly construction, difficult and costly to install and maintain, and incapable of adjustment for varying the degree of resistance to relative longitudinal rotation of such vehicles.

"Walking" mechanisms are already well known wherein two "walking" plates are used which lift the equipment beyond the center of gravity in which case the inclined portion of the vehicle trails along during the "walking." Other "walking" mechanisms are also recognized wherein inclination of the vehicle is avoided as a result of the fact that three or more "walking" legs are provided by which the vehicle is moved while retaining its horizontal position. In that case, each such "walking" leg comprises variable length members extending between the vehicle's body and a foot-plate so that three foot-plates and nine such members are employed. These nine members are subjected to different variations in length and it is extremely difficult to control them in such a manner that uncontrollable forces do not arise. This results in the vehicle being more robust in construction in order to ensure against overstressing and as a result the walking mechanism becomes rather uneconomical. If an attempt is made to prevent the stresses from arising by introducing suitable instruments, the control of the equipment becomes complicated and intricate.

Wheeled vehicles which are propelled by rotating the wheels may additionally be propelled by alternately moving the axles of the wheels forwardly and rearwardly with respect to the vehicle body in order to produce a "walking" action by this movement of the wheels. The "walking" action may be superimposed on the rotary action of the wheels so that the vehicle has two distinct propulsion systems which may act separately or concurrently.

Prior art vehicles have incorporated mechanical shafts to connect the walking wheels or feet whereas others have their walking legs connected to a foot-plate and a pair of extensible members connected to the foot-plate by a universal joint mechanism. All such prior connecting mechanisms have been through a single control mechanism.

These vehicles have the disadvantage in that, under certain operating conditions, the additional propulsion force intended to be derived from the "walking" action of the wheels is not obtained since the wheels which are being moved rearwardly with respect to the body roll backwards as a result of the reaction between the road surface and the wheel.

Other prior art "walking" vehicles have utilized two propulsion systems which can act concurrently thus enabling the vehicle to benefit from two propulsion effects.

Additionally, in other prior art vehicles there are two propulsion systems which act concurrently without any available means to actuate either one wheel or any desired number of wheels at a time.

SUMMARY OF THE INVENTION

The unique suspension system of our "walking" vehicle will enhance obstacle crossing and provide for levelling of the vehicle on either forward or side slopes. The vehicle incorporates a hydrostatic drive of conventional design as its primary propulsion means. Additionally, by virtue of its two-piece leg suspension, associated hydraulics and controls, the vehicle can, when confronted with terrain of such nature that it cannot be negotiated utilizing normal propulsion means, go into its walking mode. Each wheel can be moved forward individually and when all wheels have been advanced, the vehicle body is brought forward to its original position over the wheels. By repeating this cycle a progressive walking motion of the vehicle can be achieved.

The "walking" or leg actuating system is embodied in the mechanics of the hydraulic system and the members which it actuates. Additionally, individually activated disc brakes are integral components of the wheel drive units.

The suspension system consists of hinged, structural members at each corner of the vehicle. The upper member is mounted through bearings to the vehicle hull. A powered wheel is mounted to the lower member. The positions of each upper arm with respect to the hull and the relative position of the two arms about their common hinge point are controlled by separate actuators, combined with spring systems.

The mechanism can be described as four legs, one at each corner of the vehicle, to which the wheels are attached and each having the equivalent of a knee and a hip joint — the latter being the point at which each leg is fastened to the hull. With movable "knee" and "hip" joints each leg can be moved individually.

With both the lower and upper arms propelling the wheel of the "walking" vehicle, one such complete cycle covers a much larger distance at each actuation; it is able to "walk" over much steeper objects; and is more maneuverable.

It is an object of the present invention to provide two hinged, structural members at each corner of the "walking" vehicle's hydraulic suspension to allow the wheel to cover a longer distance at each stroke of the arms, both horizontally and vertically, than has been possible with the utilization of a single arm.

It is another object of this invention to provide a vehicle with a means for retarding the rotation of one wheel, or any number of wheels at a given time, when the wheels are reverted and increased when the wheels are advanced in order to produce an effective "walking" action.

It is yet another object of the present invention to provide a novel and improved motor vehicle having two propulsion systems which can act either concurrently or independently so that the vehicle has the benefit of a multiple propulsion effects.

It is a further object of our invention to position the individually controlled arms for increased vertical wheel travel for reducing shock loads due to bumps caused by pressure ridges in thick ice, desert terrain, stream or river banks, deep snow, forests of small trees, and other natural or man-made obstacles.

It is yet a further object of our invention to provide a vehicle which may be made extremely low by controlling vehicle ground clearance and further individual positioning of the wheels which will also provide for leveling the vehicle for improved slope performance.

BRIEF DESCRIPTION OF THE DRAWINGS

FIGS. 1, 7, 8 and 9 show the "walking" movement of the vehicle over an obstacle;

DESCRIPTION OF THE PREFERRED EMBODIMENT

Figure 1:
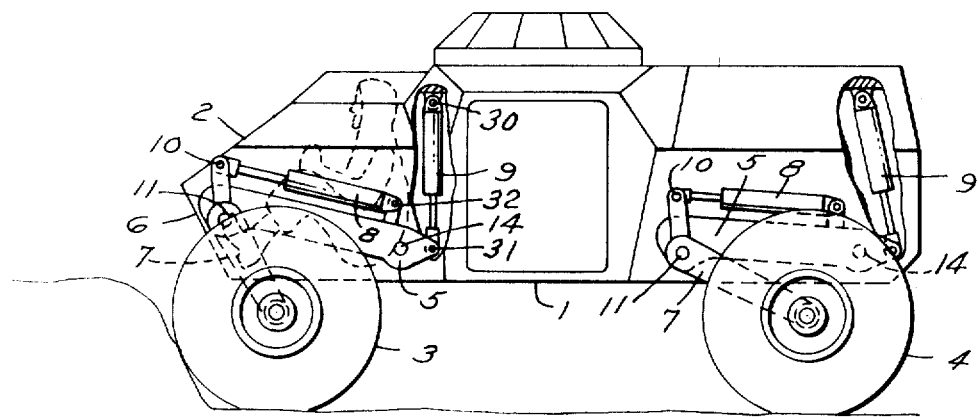
FIG. 1 is a view in side elevation of an automotive vehicle illustrating the suspension system.

FIG. 1 shows a typical two-axle vehicle having a hull 1 made from metal plate to protect the occupants and adapt the vehicle for tactical use in any terrain. Hull 1 is mounted on two pair of wheels 3 and 4, the wheels in each pair being spaced apart transversely to the direction of movement of the vehicle and being rotatable about normally substantially aligned axes. The vehicle suspension system is comprised of hinged crank arm members 5 and 7 at each corner of the vehicle. Each crank arm member 5 is pivotally connected to the hull by means of a pivot joint 14. Each crank arm member 7 is pivotally connected to the associated crank arm 5 by means of a pivot joint 11. The crank arms are powered by means of fluid cylinders 8 and 9. Each fluid cylinder 9 is trained between the hull and the respective crank arm 5, as by means of pivot connections 30 and 31. Each fluid cylinder 8 is trained between crank arms 5 and 7, as by means of pivot connections 32 and 10. Each fluid cylinder can be supplied with power fluid through the fluid supply circuit schematically shown in FIG. 10.

An engine, not shown, may be arranged within hull 1 to drive various hydraulic pumps 13a, 13b, 16 and 17 for supplying power fluid to the various cylinders 8 and 9 and to individual hydraulic motors 3L, 3r, 4L and 4r located within respective ones of the four vehicle wheels (see FIG. 11); motor 3L is located on the left front wheel, motor 3r is located on the right front wheel, motor 4L is located on the left rear wheel, and motor 4r is located on the right rear wheel. Each hydraulic motor may be drivingly coupled to the associated vehicle wheel through a planetary gearbox.

Hydraulic pumps 13a and 13b are of the variable displacement type. Each pump may be controlled internally by a pair of stroke pistons 15, which until acted upon by an external oil source, spring load each pump piston in a neutral or no flow position. Each pump 13a energizes wheel motors 3r and 4r; each pump 13b energizes two motors 3L and 4L. Direction or rotation of wheels 3 and 4 is effected by reversing inlet and outlet pressure ports in each motor which amounts to reversing the direction of oil to the hydraulic motor.

Figure 11:
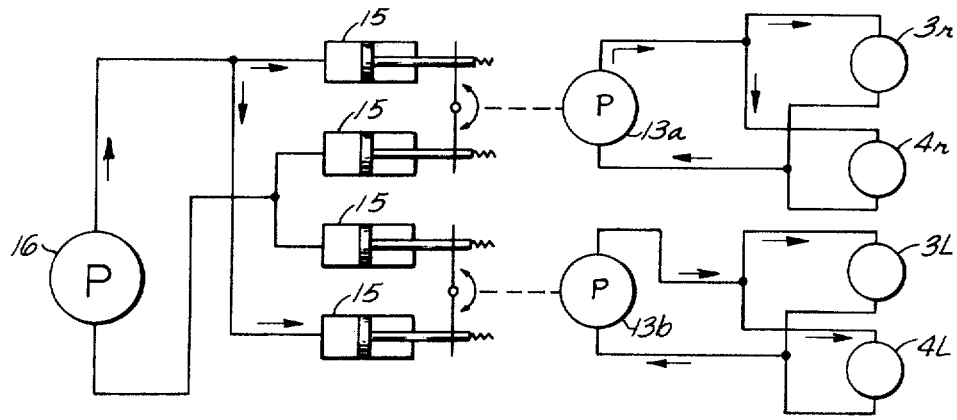
FIG. 11 is a schematic view of a hydraulic steering control circuit useful in the FIG. 1 vehicle.

The arrangement by which the vehicle is steered is schematically illustrated in FIG. 11. In this steering arrangement, otherwise referred to as "skid steer," the inner ones of the vehicle wheels 3 and 4 in direction of the turn are slowed relative to the outside wheels 3 and 4, thus affecting the turn.

In the skid steer system as incorporated in the current invention, one main drive hydraulic pump 13a is coupled to the motors on the right side of the vehicle and the other main drive hydraulic pump 13b is coupled to the motors at the left side of the vehicle. The skid steer circuit is comprised of a steering pump 16 and skid steer override stroke pistons 15a, 15b, 15c and 15d mounted on main drive hydraulic pumps 13a and 13b. As the vehicle operator turns the steering wheel (not shown) he is actuating a reversible gear steering pump 16 which forces oil under pressure into the proper stroke pistons to pull hydraulic pump 13a or 13b feeding the inside wheels "off stroke," and to pull the other hydraulic pump 13b or 13a supplying the outside wheels further "on stroke." The stroke differential developed between the two hydraulic pumps 13a and 13b is a function of the pressure developed by steering pump 16, which will in turn be a function of the force input by the operator on the steering wheel.

Assuming pumps 13a and 13b are both powered in the forward direction, the power fluid can be directed to the four motors 3r, 4r, 3L and 4L as shown by the arrows in FIG. 11, thereby producing forward motion of the vehicle. Reverse movement of pumps 13a and 13b will produce reverse flow of the power fluid, thereby achieving rearward motion of the vehicle. Turning of the vehicle is achieved by differential outputs of the two pumps 13a and 13b, as determined by steering pump 16.

Figure 5:
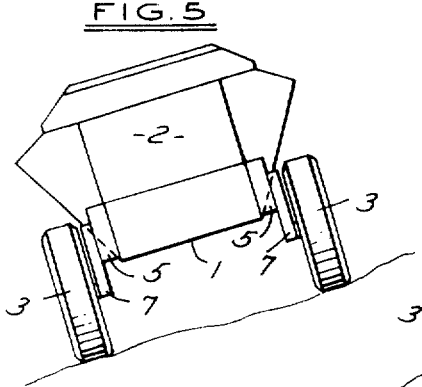
FIGS. 5 and 6 show the vehicle compensating for a slope or an inclined surface by shifting its center of gravity by hydraulic raising or lowering of the vehicle body.
Figure 6:
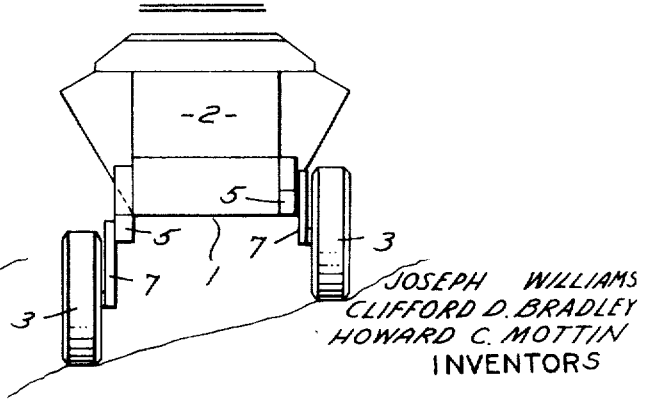

With crank arms 5 and 7 positioned as shown in FIG. 1, the vehicle travels as a spring wheeled vehicle; pressurized cylinders 8 and 9 cause arms 5 and 7 to function as vehicle suspension devices. Wherever the terrain so requires selected ones of cylinders 8 and 9 can be actuated to adjust the height of the vehicle in relation to individual ones of the ground-engaging wheels 3 and 4. One objective of such an adjustment is to keep the vehicle level for improved performance on slopes and ditches, etc. FIG. 5 illustrates undesired tilt of the vehicle on a slope. FIG. 6 shows a desired level condition of the vehicle while on the slope. Height and attitude control of the vehicle may be achieved by selective actuation of the fluid cylinders 8 and 9 on the wheels disposed on the downslope side of the vehicle.

Figure 10:
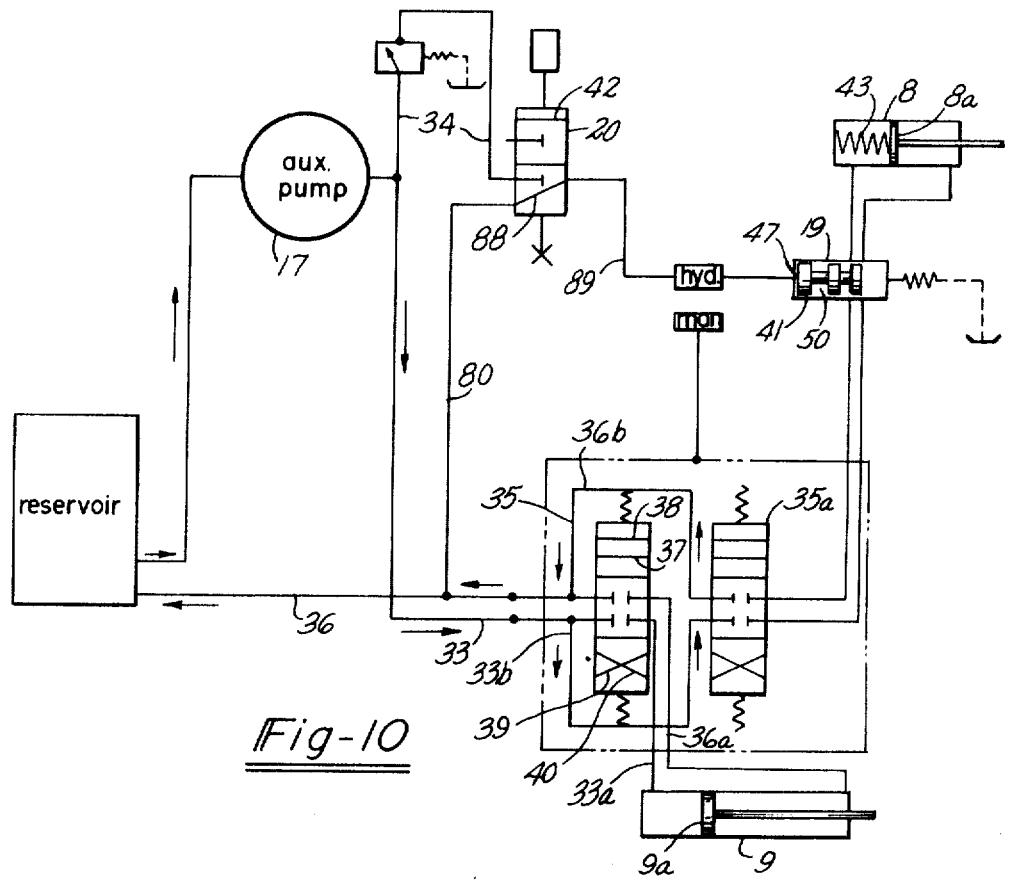
FIG. 10 is a schematic view of a hydraulic valve arrangement useful in controlling certain powered crank arms within the FIG. 1 vehicle.

FIG. 10 shows a hydraulic fluid supply for each set of cylinders 8 and 9. The supply system comprises a pump 17 which delivers pressure fluid to lines 33 and 34. Line 33 runs through a manually controlled three position valve 35. In its illustrated intermediate position the valve interrupts flow between lines 33 and 33a; it also interrupts the flow between lines 36 and 36a. The valve thus traps fluid in cylinder 9 to maintain the cylinder in a given state of pressurization or position. Downward manual movement of valve 35 causes valve passage 37 to interconnect lines 33 and 33a; it also causes valve passage 38 to interconnect lines 36 and 36a. Consequently the left end of cylinder 9 is pressurized and the right end of cylinder 9 is depressurized or drained, to produce rightward motion of the piston 9a. Upward manual movement of valve 35 causes valve passage 39 to interconnect line 33 with line 36a, and causes valve passage 40 to interconnect line 36 with line 33a. Consequently the right end of cylinder 9 is pressurized, and the left end of the cylinder is depressurized, thereby producing leftward motion of piston 9a. It is thus possible to hold the piston in any given position, or to move it into or out of the cylinder.

Cylinder 8 is controlled by a valve 35a that is similar to valve 35. Power fluid for cylinder 8 is directed through a line 33b branching from line 33. Drain fluid is directed through a branch line 36b.

Fluid cylinder 8 may be equipped with a by-pass valve 19, which will open a pressure-equalizing path across the ends of cylinder 8 upon a suitable signal from a two position dump valve 20. In its illustrated position valve 20 passage 88 interconnects line 89 with drain line 80 so that spool element 41 in valve 19 assumes the illustrated position at the left end of the valve 19 housing; consequently the condition of cylinder 8 is controlled by valve 35a. When dump valve 20 is depressed its internal passage 42 interconnects lines 34 and 89, thereby pressurizing the valve 19 space 47 to the left of spool 41 and moving the spool rightwardly so that spool space 50 bridges the two lines leading to the opposite ends of cylinder 8. This action equalizes the pressure across the ends of cylinder 8 and thereby enables piston 8a to be controlled by the external load and compression spring 43. Spring 43 absorbs shock loads while the vehicle is travelling on the road. During periods when the vehicle is undergoing an attitude change (traversing slopes or ditches or obstructions) valve 42 would be set in its illustrated position, and the system would behave as though valve 19 were not present.

FIG. 10 illustrates a hydraulic valving arrangement for cylinders 8 and 9 at one wheel of the vehicle. Similar duplicate valving arrangemnets would be provided for the cylinders at each of the other three wheels.

Figure 7:
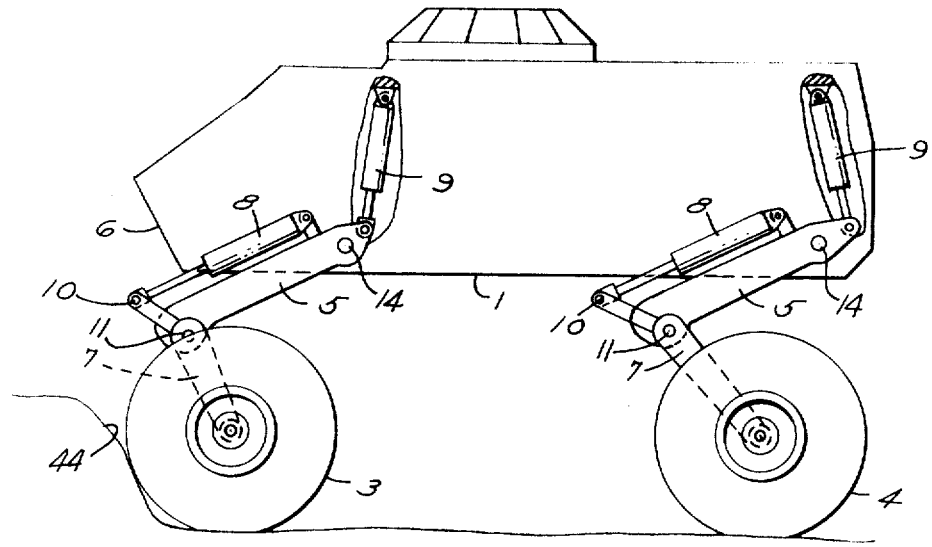
Figure 9:
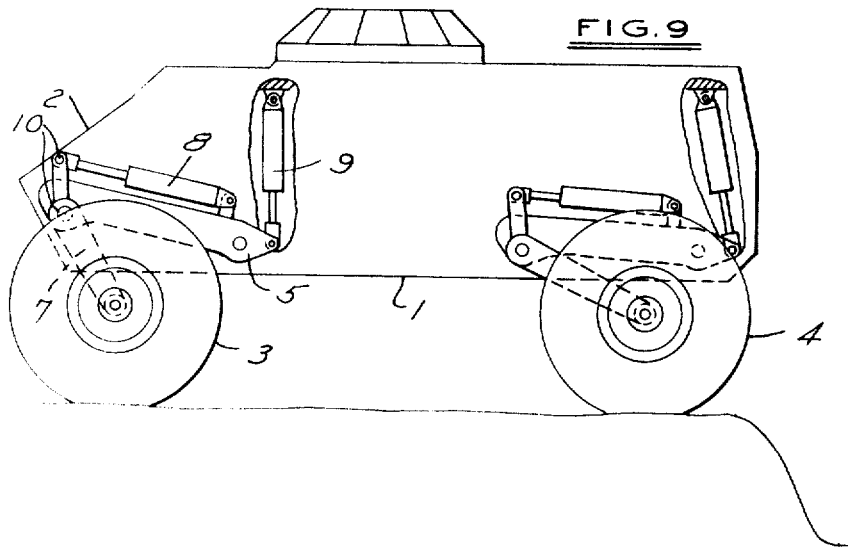

Cylinder 9 can be pressurized to power crank arm 5 about pivot 14 from the slightly inclined position of FIG. 9 to the slightly declined position of FIG. 7. During such movement the respective corner portion of the vehicle hull raises itself relative to the associated wheel; reverse pressurization of cylinder 9 produces a lowering movement of the respective corner portion of the vehicle hull.

Figure 8:
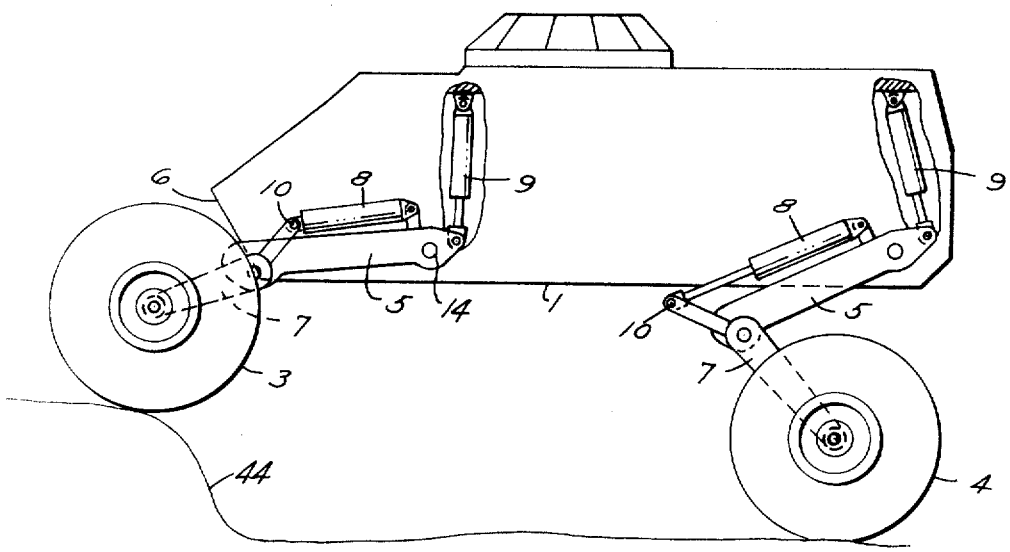

Cylinder 8 can be pressurized to power crank arm 7 about pivot 11 from the FIG. 7 rearwardly retracted position to the FIG. 8 forwardly advanced position; reverse pressurization of cylinder 8 produces reverse movement of arm 7. Arm 7 functions generally to alternately advance and retract the associated wheel horizontally relative to the hull.

FIGS. 7, 8 and 9 illustrate the general mode of vehicle movement during travel over an obstruction 44, which may be a steep slope, log, wall, the side of a ditch, etc. As shown in FIG. 7, the cylinders have been actuated to lift the vehicle while maintaining it in a level attitude. FIG. 8 shows the front cylinders 8 pressurized to advance crank arm 7 forwardly, thus moving wheel 3 up the obstruction; the vehicle remains in a level attitude. The vehicle is thereafter driven forward until the rear wheels 4 reach obstruction 44, after which the rear ones of cylinders 8 and 9 are suitably actuated (by the FIG. 10 valves) to move the vehicle to the FIG. 9 position. Forward movement of the vehicle is achieved by the power arrangement shown schematically in FIG. 11.

Figure 2:
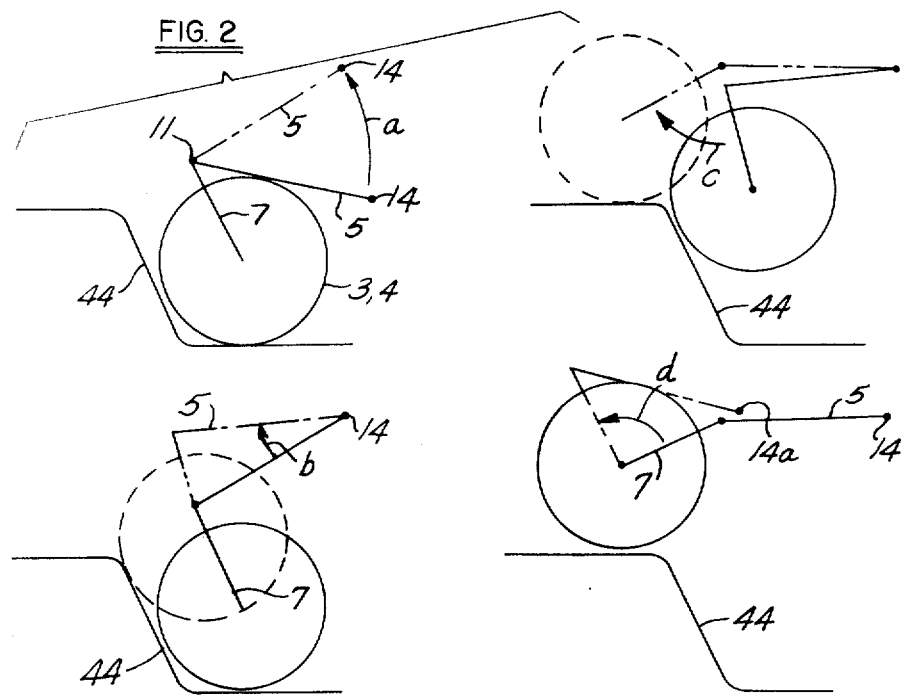
FIG. 2 is a fragmentary schematic view of the suspension system embodying the invention.
Figure 3:
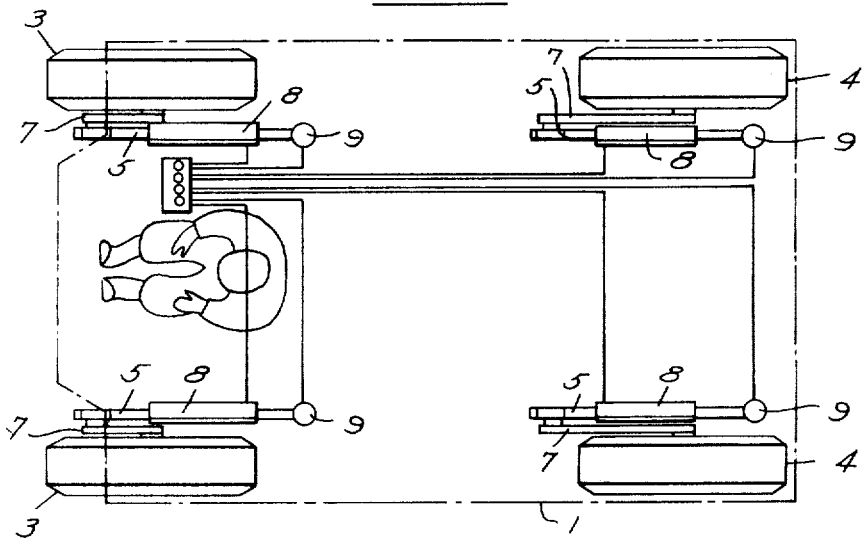
FIG. 3 is a top plan view of the vehicle showing the control circuits for the leg actuators.
Figure 4:
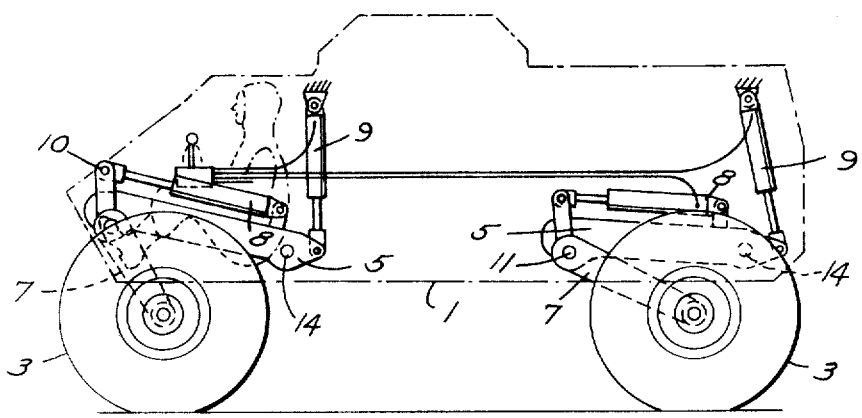
FIG. 4 is a side view illustrating the control system and its linkage to the hydraulic suspension.

FIG. 2 schematically illustrates the movement of one set of crank arms 5 and 7 during traverse of the obstruction 44. Initially arm 5 is raised about pivot 11 through arc a to elevate the hull connection point 14. Arm 5 is then raised about pivot 14 through arc b to move the wheel up the slope; arm 7 can be biased forward to maintain traction between the wheel and the slope surface. Arm 7 is then raised about pivot 11 through arc c to advance the wheel relative to he hull. Arm 7 is then moved through arc d to pull the hull forwardly; hull connection point 14 moves forwardly to point 14a. During these movements of the crank arms and hull the wheel motors may be energized to promote forward movement of the hull and tractive power engagement of the wheels on the slope surface.

The vehicle can traverse various slopes, ditches or obstructions while still maintaining a level attitude. In some instances it may be necessary or desirable to "walk" the vehicle over a ditch, hump, etc. In the walking mode one or two wheels may be raised and advanced as shown in FIG. 2, while the remaining three or two wheels are braked to provide a reactive force. The walking action is accomplished by energization of cylinders 8 and 9, with or without powering of the wheels by the wheel motors. The walking wheel(s) ride up the slope under tractive effects provided by the appropriate cylinders 8 and 9, assisted by the wheel motors.

Vehicles using the invention retain desired performance capabilities of high speed on roads or other smooth surfaces, plus off-road mobility over slopes or obstacles not normally negotiated by standard vehicles.

Other advantages of the present invention will become apparent to those of ordinary skill in the art by the following description when considered in relation to the accompanying drawings.

We wish it to be understood that we do not desire to be limited to the exact details of construction shown and described for obvious modifications will occur to a person skilled in the art.

What we claim is:

1. A vehicle comprising a hull; at least four wheels arranged on transverse axles for moving said hull in at least the forward direction; and a suspension means interposed between each wheel and the hull; each suspension means comprising a first powered member operable to raise and lower the associated section of the hull relative to the associated wheel, and a second powered member operable to reciprocate the axle of the associated wheel forwardly and rearwardly relative to the hull; said powered members being independently movable to provide various different combinations of hull elevations and wheel axle positions of reciprocation; each of said first powered members comprising a first crank arm pivotally connected to the hull, and each of the second powered members comprising a second crank arm pivotally connected to the first crank arm; the associated wheel having its axle journalled on the second crank arm so that the crank arms are interposed in series between the wheel and hull.

2. The vehicle of claim 1 wherein the first crank arm is arranged to swing vertically between a first inclined position and a second declined position, and the second crank arm is arranged to swing horizontally in pendulum fashion between a first forwardly advanced position and a second rearwardly retracted position.

3. The vehicle of claim 1 wherein the crank arms are powered by means which includes a fluid cylinder interconnected between each first crank arm and the corresponding second crank arm.

4. The vehicle of claim 1 wherein each of said first crank arms is arranged to swing vertically between a first inclined position and a second declined position, and each of said second crank arms depends in pendulum fashion from its associated first arm to swing horizontally between a first forwardly advanced position and a second rearwardly retracted position; said crank arms being powered by means of a first fluid cylinder interconnected between the hull and each of said first crank arms, and a second fluid cylinder interconnected between the two associated crank arms.

* * * * *